(12) United States Patent
Wang et al.

(10) Patent No.: US 11,383,319 B2
(45) Date of Patent: Jul. 12, 2022

(54) METHOD OF JOINING STEEL HAVING DIFFERENT RESISTIVITIES

(71) Applicant: GM GLOBAL TECHNOLOGY OPERATIONS LLC, Detroit, MI (US)

(72) Inventors: Pei-chung Wang, Troy, MI (US); Michael J. Karagoulis, Okemos, MI (US); Spyros P. Mellas, Waterford, MI (US); Steven Cipriano, Chesterfield Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 531 days.

(21) Appl. No.: 16/561,305

(22) Filed: Sep. 5, 2019

(65) Prior Publication Data
US 2021/0069821 A1     Mar. 11, 2021

(51) Int. Cl.
*B23K 11/16* (2006.01)
*B23K 11/20* (2006.01)

(52) U.S. Cl.
CPC .......... *B23K 11/163* (2013.01); *B23K 11/20* (2013.01)

(58) Field of Classification Search
CPC .... B23K 11/0066; B23K 11/163; B23K 11/20
(Continued)

(56) References Cited

U.S. PATENT DOCUMENTS

| 4,514,612 A | 4/1985 | Nied et al. |
| 5,302,797 A | 4/1994 | Yasuyama et al. |

(Continued)

FOREIGN PATENT DOCUMENTS

| BR | 9704888 A | 5/1999 |
| CN | 105190059 A | 12/2015 |

(Continued)

OTHER PUBLICATIONS

U.S. Appl. No. 15/952,645, titled "Resistance Spot Brazing Workpiece Stack-Ups Having One or More Thin-Gauge Steel Workpieces," filed on Apr. 13, 2018 by GM Global Technology Operations LLC.

(Continued)

*Primary Examiner* — Dana Ross
*Assistant Examiner* — Joseph W Iskra
(74) *Attorney, Agent, or Firm* — Vivacqua Crane, PLLC

(57) ABSTRACT

A method of joining a multiple member work-piece includes providing a first steel work-piece having a first electrical resistivity and a second steel work-piece having a second electrical resistivity that is lower than the first electrical resistivity. A third material is disposed in contact with the second steel work-piece. The third material has an electrical resistivity that is greater than the second electrical resistivity. The method includes resistance welding the first and second work-pieces together. The third material may be in the form of a rivet, a third work-piece, or a coating material disposed between the first and second work-pieces. A bonded assembly includes steel members and a third material being bonded together, wherein the electrical resistivity of the second member is lower than the electrical resistivity of the first member, and the third material has an electrical resistivity that is greater than the electrical resistivity of the second member.

20 Claims, 4 Drawing Sheets

(58) Field of Classification Search
USPC ........................................................ 403/272
See application file for complete search history.

(56) References Cited

U.S. PATENT DOCUMENTS

| | | | |
|---|---|---|---|
| 6,107,595 A | 8/2000 | Peterson | |
| 8,250,728 B2 | 8/2012 | Stevenson et al. | |
| 9,737,956 B2 | 8/2017 | Yang et al. | |
| 10,052,710 B2 | 8/2018 | Sigler et al. | |
| 2014/0124485 A1* | 5/2014 | Tseng .................. | B23K 11/002 219/117.1 |
| 2014/0367368 A1 | 12/2014 | Yang et al. | |
| 2015/0044450 A1 | 2/2015 | Yuasa et al. | |
| 2015/0174690 A1 | 6/2015 | Furusako et al. | |
| 2015/0357621 A1 | 12/2015 | Hardy et al. | |
| 2016/0136752 A1 | 5/2016 | Aoyama | |
| 2017/0297135 A1 | 10/2017 | Sigler et al. | |
| 2017/0316556 A1 | 11/2017 | Spinella et al. | |
| 2017/0349220 A1 | 12/2017 | Yamada et al. | |
| 2019/0224773 A1 | 7/2019 | Radomski et al. | |

FOREIGN PATENT DOCUMENTS

| | | |
|---|---|---|
| CN | 105689874 A | 6/2016 |
| CN | 107297564 A | 10/2017 |
| CN | 108136690 A | 6/2018 |
| JP | 2010207898 | 9/2010 |
| JP | 2015062911 A | 4/2015 |
| JP | 2017100148 A | 6/2017 |

OTHER PUBLICATIONS

U.S. Appl. No. 16/034,712, titled "Pretreatment of Weld Flanges to Mitigate Liquid Metal Embrittlement Cracking in Resistance Welding of Galvanized Steels," filed on Jul. 13, 2018 by GM Global Technology Operations LLC.

* cited by examiner

METHOD OF JOINING STEEL HAVING DIFFERENT RESISTIVITIES

TECHNICAL FIELD

This disclosure relates to joining steel members that have different resistivities, and an assembly including the joined members.

INTRODUCTION

Resistance welding has been a common and successful process for joining steel work-pieces together. Resistance welding has largely been successful because the materials being joined were the same or very similar to one another. In recent years, newer more advanced high-strength steels have been developed, which have many desirable properties. However, when attempting to resistance weld steel work-pieces together where each of the steel work-pieces is largely different from one another, the result has been a lack of weld penetration into the milder (lower strength) steel. When each of the steel work-pieces have resistivities that differ to a large extent, the weld penetration may be inadequate, and the weld joint may easily break apart.

SUMMARY

The present disclosure provides a method for joining steel work-pieces together that have different resistivities and a resultant joined assembly. A third material, which may be in the form of a rivet, a third work-piece, or a thermal spray coating, by way of example, is used to concentrate the welding heat into the steel having the lower electrical resistivity, which results in balanced weld penetration and a good weld joint.

In one form, which may be combined with or separate from the other forms described herein, a method of joining a multiple member work-piece is provided. The method includes providing a first steel work-piece having a first electrical resistivity and a second steel work-piece having a second electrical resistivity that is lower than the first electrical resistivity. The method also includes disposing a third material in contact with at least the second steel work-piece, the third material having a third electrical resistivity that is greater than the second electrical resistivity. The method further includes resistance welding the first and second work-pieces and the third material together.

In another form, which may be combined with or separate from the other forms disclosed herein, a bonded assembly is provided that includes a first member formed of a first steel material having a first electrical resistivity and a second member formed of a second steel material having a second electrical resistivity that is lower than the first electrical resistivity. A third material is disposed in contact with at least the second steel member, the third material having a third electrical resistivity that is greater than the second electrical resistivity. The first and second members and the third material are bonded together.

Additional features may optionally be provided, including but not limited to the following: the third material being in contact with the first work-piece/member; the third electrical resistivity being less than or equal to the first electrical resistivity; the third electrical resistivity being at least double the second electrical resistivity; the first electrical resistivity being at least three times the second electrical resistivity; the third electrical resistivity being less than three times the second electrical resistivity; the first steel work-piece being formed of a third-generation (GEN 3) steel; the second steel work-piece being formed of an interstitial free (IF) steel; and/or the third material being a boron steel alloy.

In some examples, the third material is provided in the form of a rivet inserted through the second steel work-piece. The rivet has a head disposed on an outer side of the second work-piece, and the rivet may have a shank inserted through the second member. Resistance welding is performed by pressing a first electrode against the head of the rivet and a second electrode against an outer side of the first work-piece and passing a current between the first and second electrodes through the first and second work-pieces and through the rivet. The rivet may also be pressed into the first steel work-piece. The resultant bonded assembly includes the head of the rivet being bonded to the second member, and the shank of the rivet being bonded to both the first member and the second member.

In other examples, the third material may be provided in the form of a third work-piece disposed between the first and second work-pieces. In such cases, a rivet may be disposed through the second work-piece and into the third work-piece. Resistance welding may be performed by pressing a first electrode against the head of the rivet and a second electrode against an outer side of the first work-piece and passing a current between the first and second electrodes through the first, second, and third work-pieces and through the rivet. The rivet may be formed of a material having a fourth electrical resistivity that is greater than the second electrical resistivity. The resultant bonded assembly includes the head of the rivet being bonded to the second member, and the shank of the rivet being bonded to both the second member and the third member.

In yet other examples, the third material may be provided in the form a coating, such as a thermal spray coating, disposed between the first and second work-pieces or members. The third material may be, for example, nickel, an aluminum silicon alloy, and/or a boron steel alloy.

The above features and advantages and other features and advantages are readily apparent from the following detailed description when taken in connection with the accompanying drawings.

BRIEF DESCRIPTION OF THE DRAWINGS

The drawings are provided for illustration purposes only and are not intended to limit the scope of the application or the claims.

DESCRIPTION

Figure 1:
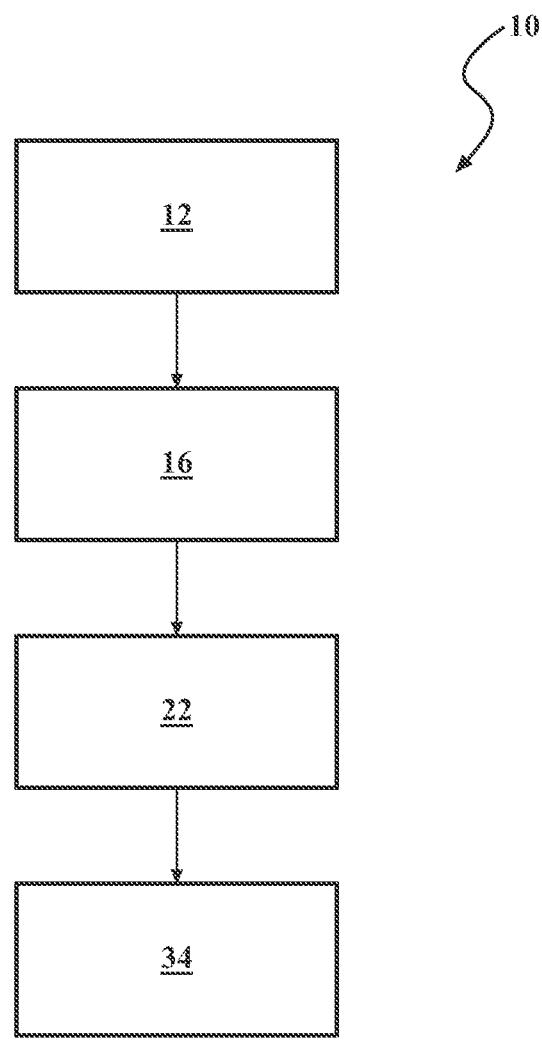
FIG. 1 is a block diagram illustrating a method of joining a multiple work-piece stack-up, according to the principles of the present disclosure.
Figure 2A:
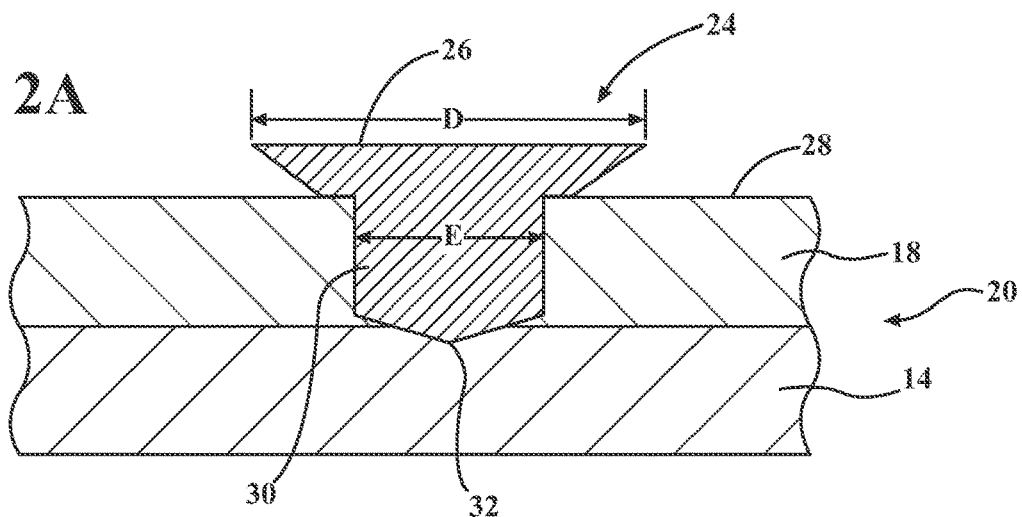
FIG. 2A is a schematic cross-sectional view of a multiple work-piece stack-up having a rivet inserted into the stack-up, in accordance with the principles of the present disclosure.

Referring to the drawings, wherein like reference numbers refer to like components, FIG. 1 is a block diagram illustrating, at a high level, a method 10 for joining a multiple member work-piece. Referring to FIG. 2A, along with FIG. 1, the method 10 includes a step 12 of providing a first steel work-piece 14 having a first electrical resistivity and a step 16 of providing a second steel work-piece 18 having a second electrical resistivity that is lower than the first electrical resistivity. As shown in FIG. 2A, the first and second work-pieces 14, 18 are provided in a stack-up 20 to a prepare for a resistance welding operation, with the second work-piece 18 being disposed on the first work-piece 14.

As explained above, because the resistivities of the first and second work-pieces 14, 18 are different from one another, with the electrical resistivity of the second work-piece 18 being lower than the electrical resistivity of the first work-piece 14, the weld joint would typically not penetrate well into the second work-piece because heat would be concentrated in the work-piece 14 having a higher electrical resistivity. To provide for a well-penetrated weld joint, the method 10 includes a step 22 of disposing a third material in contact with both the first and second steel work-pieces 14, 18, where the third material has a third electrical resistivity that is greater than the second electrical resistivity.

In the example of FIG. 2A, the third material is provided as an insert or rivet 24 that is inserted through the second steel work-piece 18, and the rivet 24 may also contact the first steel work-piece 14. The rivet 24 has a head 26 disposed on an outer side 28 of the second work-piece 18 and a shank 30 disposed through the second work-piece 18 and which is also pressed into the first work-piece 14 at a tip 32 of the shank 30. The rivet 24 could be a self-piercing rivet or another type of insert or rivet. In the illustrated example, the head 26 has a diameter D that is more than twice the diameter E of the shank 30, but other head diameters could alternatively be used without falling beyond the spirit and scope of the present disclosure.

Figure 2B:
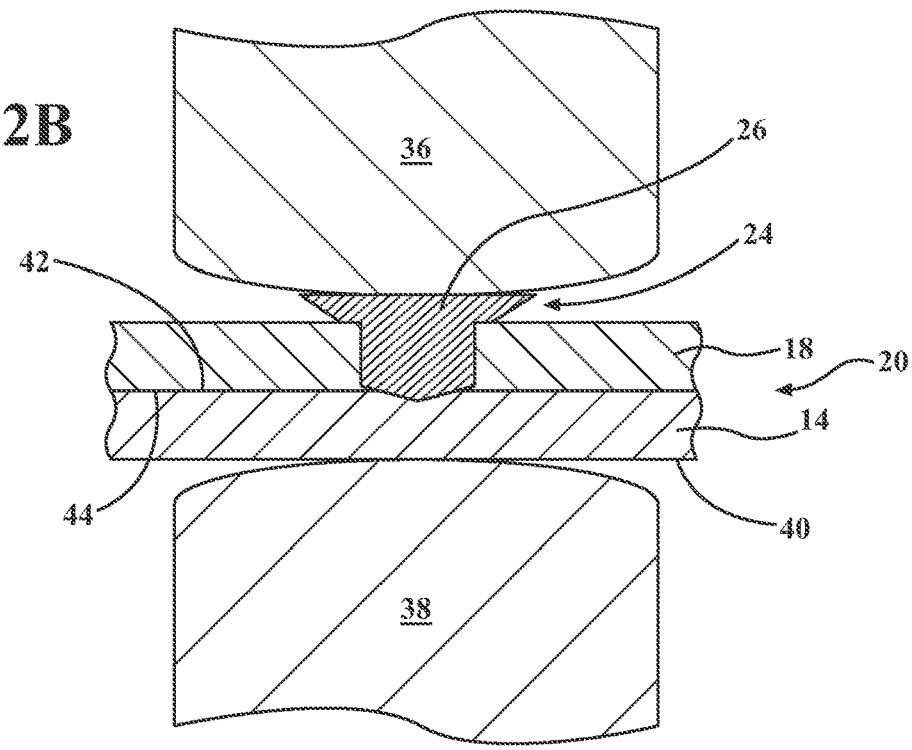
FIG. 2B is a schematic cross-sectional of view of the multiple work-piece stack-up of FIG. 2A, having a pair of electrodes disposed on each side of the stack-up, according to the principles of the present disclosure.

Referring now to FIG. 2B, and with continued reference to FIG. 1, the method 10 further comprises a step 34 of resistance welding the first and second work-pieces 14, 18 and the third material 24 together. In the example of FIG. 2B, the resistance welding is a resistance spot welding operation that is performed by pressing a first electrode 36 against the head 26 of the rivet 24 and a second electrode 38 against an outer side 40 of the first work-piece 14. A current is passed between the first and second electrodes 36, 38 through the first and second work-pieces 14, 18 and through the rivet 24. As the current is passed through the rivet shank 30, joule heat generation is enhanced at the faying surfaces 42, 44 between the first and second work-pieces 14, 18, which improves the weld penetration into second steel work-piece 18, which has the lower electrical resistivity of the work-pieces 14, 18. The weld penetration into the second steel work-piece 18 is improved, at least in part, because the electrical resistivity of the rivet 24 is higher than the electrical resistivity of the second work-piece 18. The large head 26 of the rivet 24 also aids in weld penetration into the second work-piece 18.

Figure 2C:
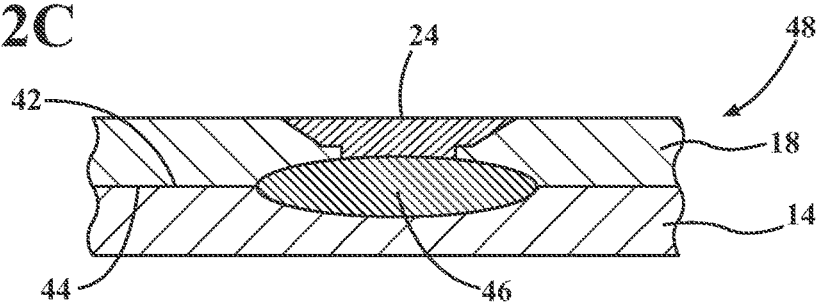
FIG. 2C is a schematic cross-sectional view of bonded assembly formed by joining the stack-up of FIGS. 2A-2B, in accordance with the principles of the present disclosure.

Referring now to FIG. 2C, a balanced weld nugget 46 is therefore formed at the faying surfaces 42, 44 of the steel work-pieces 14, 18, where the weld nugget 46 penetrates well into both of the work-pieces 14, 18. For example, the weld nugget 46 may penetrate into each work-piece 14, 18 by at least 25% (and may be up to 75%) of the total of the weld nugget 46. Thus, FIG. 2C illustrates a bonded assembly 48 that includes the first member 14, the second member 18, and the third material (which is the rivet 24) bonded together through the weld nugget 46.

In some examples, the third electrical resistivity (the electrical resistivity of the rivet material) may be less than or equal to the electrical resistivity of the first work-piece 14, but in other examples, the electrical resistivity of the rivet 24 could be even greater than the electrical resistivity of the first work-piece 14. (Both the resistivities of the first work-piece 14 and the rivet 24 are greater than the electrical resistivity of the second work-piece 18).

In other examples, the electrical resistivity of the rivet 24 has a value somewhere in between the values of the resistivities of the first and second work-pieces 14, 18. For example, the electrical resistivity of the rivet 24 could be at least double the electrical resistivity of the second work-piece 18, and the electrical resistivity of the first work-piece 14 could be at least three times the electrical resistivity of the second work-piece. In some examples, the electrical resistivity of the rivet 24 could be more than double the electrical resistivity of the second work-piece 18, but less than three times the electrical resistivity of the second work-piece 18.

Some examples of steel materials that could be used for the first work-piece 14 could be second-generation high-strength (GEN 2) steels (austenitic stainless steels), third-generation advanced high-strength (GEN 3) steels, transformation-induced plasticity (TRIP) steels, twinning-induced plasticity (TWIP) steels, boron steel alloys, and/or any other steel that has a relatively large electrical resistivity. For example, if a GEN 3 steel is used, the electrical resistivity may be about 40-60 $\mu\Omega \cdot cm$ at 20 degrees Celsius. (All electrical resistivity values given herein are at 20 degrees Celsius).

Some examples of steel materials that could be used for the second work-piece 18 include interstitial free (IF) steels or other mild steels, high-strength low alloy steels (such as 340HSLA), dual-phase steels (such as DP590), and martensitic steels (such as MS1500). If an IF steel is used, the electrical resistivity may be about 12-13 $\mu\Omega \cdot cm$. A 340HSLA steel could have an electrical resistivity of about 18-20 $\mu\Omega \cdot cm$, a DP590 steel could have an electrical resistivity of about 19-20 $\mu\Omega \cdot cm$, and a MS1500 steel could have an electrical resistivity of about 19-20 $\mu\Omega \cdot cm$.

The rivet 24 could also be formed of a steel having a relatively large electrical resistivity. For example, the rivet 24 could be formed of a boron steel alloy (such as PHS1300), a GEN 3 steel, a multi-phase steel (such as MP1180 or MP980), a dual-phase steel (such as DP980, DP780, or DP590), or a high-strength low alloy steel (such as 340HSLA). If a PHS1300 boron steel alloy is used, the electrical resistivity may be about 26-28 μΩ·cm. An MP1180 steel could have an electrical resistivity of about 30-32 μΩ·cm, a DP980 steel could have an electrical resistivity of about 29-35 μΩ·cm, an MP980 steel could have an electrical resistivity of about 26-34 μΩ·cm, and a DP780 steel could have an electrical resistivity of about 24-31 μΩ·cm.

In one example, the first work-piece 14 is formed of a GEN 3 steel having an electrical resistivity of about 40-60 μΩ·cm, the second work-piece 18 is formed of an IF steel having an electrical resistivity of about 12-13 μΩ·cm, and the rivet 24 is formed of a boron steel alloy (more specifically, PHS1500), having an electrical resistivity of about 26-28 μΩ·cm. Accordingly, the electrical resistivity of the rivet 24 is more than double that of the second work-piece 18, but the electrical resistivity of the first work-piece 14 is more than three times the electrical resistivity of the second work-piece 18 and greater than the electrical resistivity of the rivet 24.

Figure 3A:
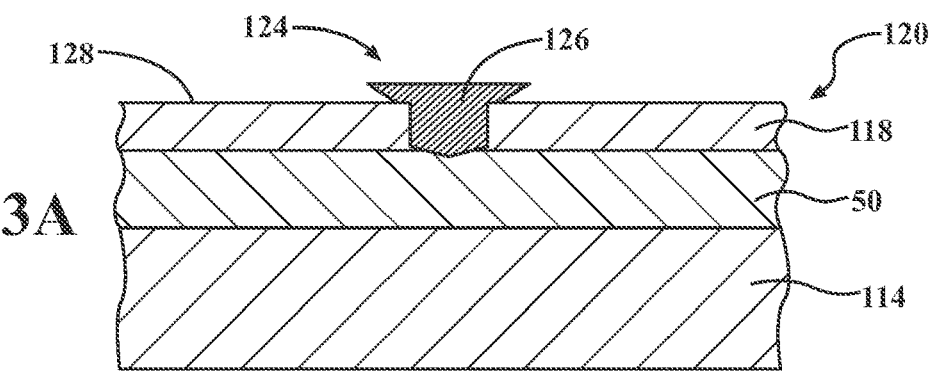
FIG. 3A is a schematic cross-sectional view of another multiple work-piece stack-up having a rivet inserted into the stack-up, in accordance with the principles of the present disclosure.
Figure 3B:
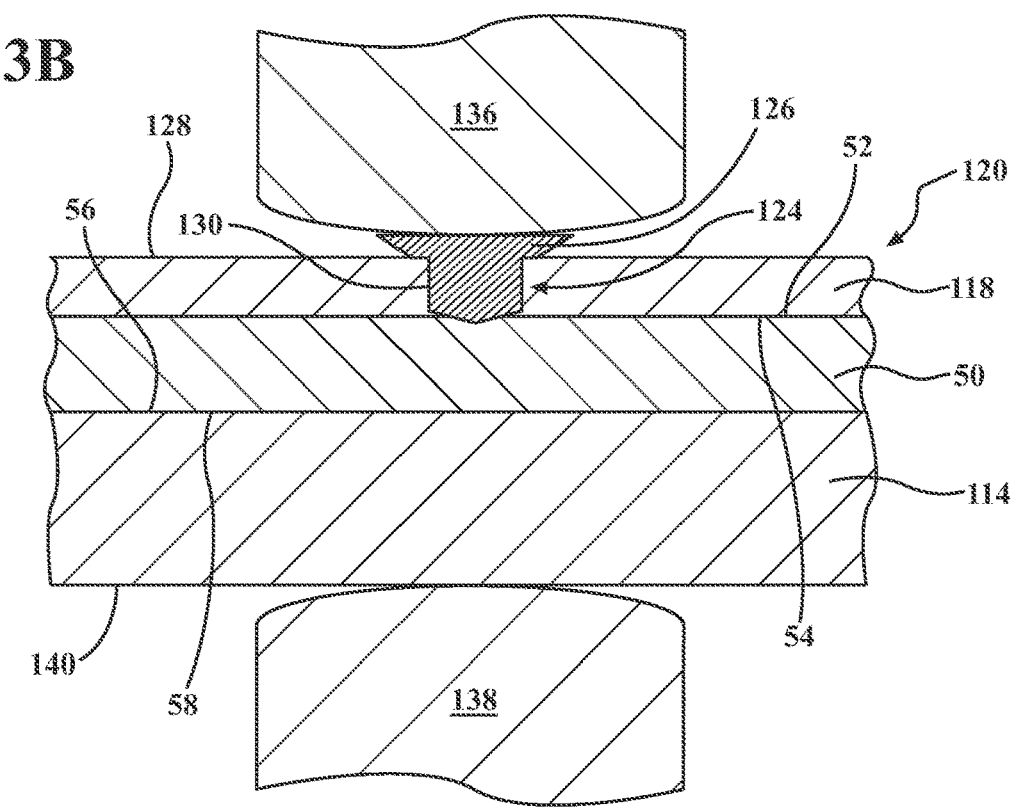
FIG. 3B is a schematic cross-sectional of view of the multiple work-piece stack-up of FIG. 3A, having a pair of electrodes disposed on each side of the stack-up, according to the principles of the present disclosure.
Figure 3C:
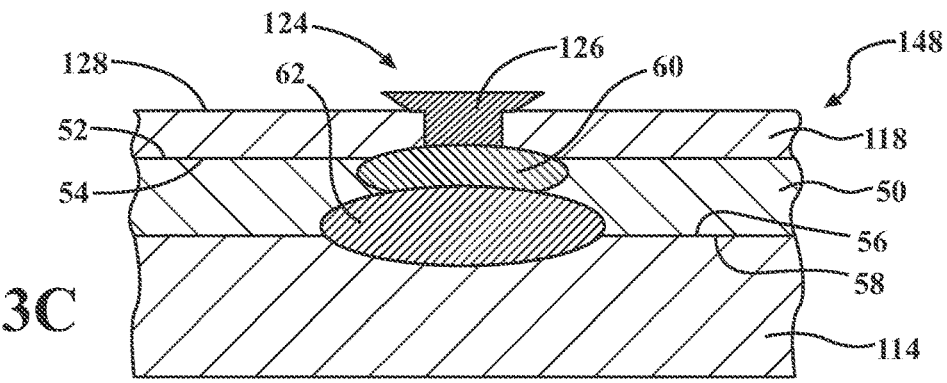
FIG. 3C is a schematic cross-sectional view of bonded assembly formed by joining the stack-up of FIGS. 3A-3B, in accordance with the principles of the present disclosure.

Referring now to FIGS. 3A-3C, another example of an application of the method 10 of FIG. 1 is illustrated. In this example, a third work-piece 50 is disposed between (sandwiched between) first and second work-pieces 114, 118 in a work-piece stack-up 120. A rivet 124 is disposed through the second work-piece 118 and into the third work-piece 50. The rivet 124 has a head 126 disposed on an outer side 128 of the second work-piece 118 and shank 130 disposed through the second work-piece 118 and in contact with the third work-piece 50. Though the shank 130 does not extend through the third work-piece 50 to the first work-piece 114, it should be understood that, in another example, the shank 30 could extend all the way through the third work-piece 50 and into contact with the first work-piece 114. In the other extreme, the shank 130 could be much shorter and not fully extend through the second work-piece 118 to contact the third work-piece 50.

Similar to the example given above, the resistivities of the first and second work-pieces 114, 118 are different from one another, with the electrical resistivity of the second work-piece 118 being lower than the electrical resistivity of the first work-piece 114. To provide for a well-penetrated weld joint, the method 10 includes a step 22 of disposing a third material in contact with both the first and second steel work-pieces 114, 118, where the third material has a third electrical resistivity that is greater than the second electrical resistivity. In the example of FIG. 3A, the third material is provided in the form of the third work-piece 50, which has an electrical resistivity higher than that of the second work-piece 118 but lower than that of the first work-piece 114. An insert or rivet 124 is also inserted through the second steel work-piece 118 and contacting the third steel work-piece 50 to provide for greater heating in the second work-piece 118. The rivet 124 also has an electrical resistivity that is greater than the electrical resistivity of the second work-piece 118, and the electrical resistivity of the rivet 124 is also preferably greater than the electrical resistivity of the third work-piece 50.

Referring now to FIG. 3B, a resistance spot welding operation is performed by pressing a first electrode 136 against the head 126 of the rivet 124 and a second electrode 138 against an outer side 140 of the first work-piece 114. A current is passed between the first and second electrodes 136, 138 through the first, second, and third work-pieces 114, 118, 50 and through the rivet 124. As the current is passed through the rivet shank 130 and the third work-piece 50, joule heat generation is enhanced at the faying surfaces 52, 54, 56, 58, which improves the weld penetration into steel work-piece 118 that has the low electrical resistivity.

Referring now to FIG. 3C, a balanced weld nugget 60 is therefore formed at the faying surfaces 52, 54 of the third and second steel work-pieces 50, 118, where the weld nugget 60 penetrates well into both of the work-pieces 50, 118; and a balanced weld nugget 62 is formed between the faying surfaces 56, 58 of the first and third work-pieces 114, 50, where the weld nugget 62 penetrates well into both of the work-pieces 114, 50. For example, the weld nugget 60 may penetrate into each of the third and second work-pieces 50, 118 by 25-75% of the total of the weld nugget 60; and the weld nugget 62 may penetrate into each of the first and third work-pieces 114, 50 by 25-75% of the total weld nugget 62. Thus, FIG. 3C illustrates a bonded assembly 148 that includes the first member 114, the second member 118, the third member 50, and the rivet 124 bonded together through the weld nuggets 60, 62.

The electrical resistivity of the third work-piece 50 preferably has a value between the values of the resistivities of the first and second work-pieces 114, 118, but in some examples, the electrical resistivity of the third work-piece 50 may be equal to that of either of the first or second work-pieces, and in another example, the electrical resistivity of the third work-piece could be greater than that of the first work-piece. Like the example given with respect to FIGS. 2A-2C above, the electrical resistivity of the rivet 124 may be less than or equal to the electrical resistivity of the first work-piece 114, but in other examples, the electrical resistivity of the rivet 124 could be greater than the electrical resistivity of the first work-piece 114. In other examples, the electrical resistivity of the rivet 124 has a value somewhere in between the values of the resistivities of the first and second work-pieces 114, 118. For example, the electrical resistivity of the rivet 124 could be at least double the electrical resistivity of the second work-piece 118, and the electrical resistivity of the first work-piece 114 could be at least three times the electrical resistivity of the second work-piece 118. In some examples, the electrical resistivity of the rivet 124 could be more than double the electrical resistivity of the second work-piece 118, but less than three times the electrical resistivity of the second work-piece 118.

Some examples of steel materials that could be used for the first work-piece 114 could be second-generation high-strength (GEN 2) steels (austenitic stainless steels), third-generation advanced high-strength (GEN 3) steels, transformation-induced plasticity (TRIP) steels, twinning-induced plasticity (TWIP) steels, boron steel alloys, and/or any other steel that has a relatively large electrical resistivity. Some examples of steel materials that could be used for the second work-piece 118 include interstitial free (IF) steels or other mild steels, high-strength low alloy steels (such as 340HSLA), dual-phase steels (such as DP590), and martensitic steels (such as MS1500). The rivet 124 could also be formed of a steel having a relatively large electrical resistivity. For example, the rivet 124 could be formed of a boron steel alloy (such as PHS1300), a GEN 3 steel, a multi-phase steel (such as MP1180 or MP980), a dual-phase steel (such as DP980, DP780, or DP590), or a high-strength low alloy steel (such as 340HSLA).

The third work-piece 50 may be formed of any of the steels mentioned above, such as second-generation high-strength (GEN 2) steels (austenitic stainless steels), third-generation advanced high-strength (GEN 3) steels, transformation-induced plasticity (TRIP) steels, twinning-induced plasticity (TWIP) steels, boron steel alloys (such as PHS1300), multi-phase steels (such as MP1180 or MP980), dual-phase steels (such as DP980, DP780, or DP590), high-strength low alloy steels (such as 340HSLA), or interstitial free (IF) steels or other mild steels, by way of example. In a preferred example, the third work-piece material is chosen as a steel that has an electrical resistivity between that of the first and second work-pieces 114, 118.

In one example, the first work-piece 114 is formed of a GEN 3 steel having an electrical resistivity of about 40-60 μΩ·cm, the second work-piece 118 is formed of an IF steel having an electrical resistivity of about 12-13 μΩ·cm, the third work-piece 50 is formed of a dual-phase steel (more specifically, DP 590) having an electrical resistivity of a about 19-20 μΩ·cm, and the rivet 124 is formed of a boron steel alloy (more specifically, PHS1500), having an electrical resistivity of about 26-28 μΩ·cm. Accordingly, the electrical resistivity of the rivet 124 is more than double that of the second work-piece 118, but the electrical resistivity of the first work-piece 114 is more than three times the electrical resistivity of the second work-piece 114 and greater than the electrical resistivity of the rivet 124. The electrical resistivity of the third work-piece 50 is greater than that of the second work-piece 118, but lower than that of both the rivet 124 and the first work-piece 114.

Referring now to FIGS. 4A-4D, yet another example of the application of the method 10 of FIG. 1 is illustrated. In this example, a material is coated onto one of the work-pieces. In one variation, the material is thermally sprayed onto a first work-piece 214 to form a thermal spray coating 64 on the first work-piece 214. For example, a torch may be used to atomize the material into a powder that forms the coating 64 on the first work-piece 214. In the alternative, the coating 64 could be formed by another process, such as by hot dipping. A second work-piece 218 is disposed onto the first work-piece 214 with the coating 64 disposed between the two work-pieces 214, 218 to form a work-piece stack-up 220.

Similar to the examples given above, the resistivities of the first and second work-pieces 214, 218 are different from one another, with the electrical resistivity of the second work-piece 218 being lower than the electrical resistivity of the first work-piece 214. To provide for a well-penetrated weld joint, the coating 64 is disposed in contact with both the first and second steel work-pieces 214, 218, where the material of the coating has an electrical resistivity that is greater than the electrical resistivity of the second work-piece 218. Though not shown in this example, an insert or rivet 24, 124 could also inserted through the second steel work-piece 218 as illustrated above in the other examples.

Figure 4A:
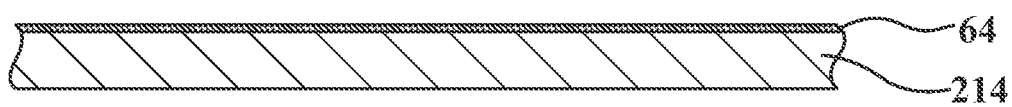
FIG. 4A is a schematic cross-sectional view of a work-piece having a thermal spray coating disposed thereon, in accordance with the principles of the present disclosure.
Figure 4B:
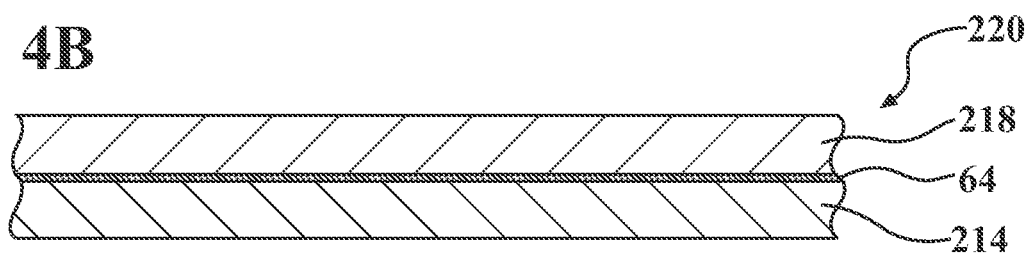
FIG. 4B is a schematic cross-sectional view of a multiple work-piece stack-up including the work-piece of FIG. 4A and another work-piece disposed thereon with the thermal spray coating disposed therebetween, according to the principles of the present disclosure.
Figure 4C:
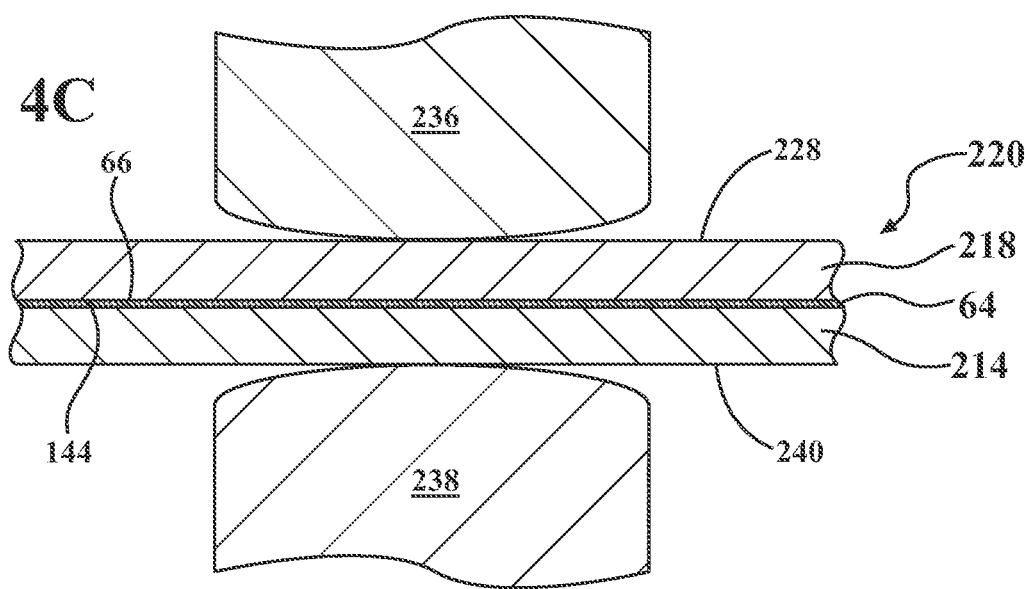
FIG. 4C is a schematic cross-sectional of view of the multiple work-piece stack-up of FIG. 4B, having a pair of electrodes disposed on each side of the stack-up, according to the principles of the present disclosure.

Referring now to FIG. 4C, a resistance spot welding operation is performed by pressing a first electrode 236 against an outer side 228 of the second work-piece 218 and a second electrode 238 against an outer side 240 of the first work-piece 214. A current is passed between the first and second electrodes 236, 238 through the first and second work-pieces 214, 218 and through the coating 64. As the current is passed through the coating 64 and the work-pieces 214, 218, the coating 64 enhances joule heat generation at the faying surfaces 144, 66, which improves the weld penetration into steel work-piece 218 that has the lower electrical resistivity. The electrical resistivity of the coating 64 is higher than the electrical resistivity of the second work-piece 218.

Figure 4D:
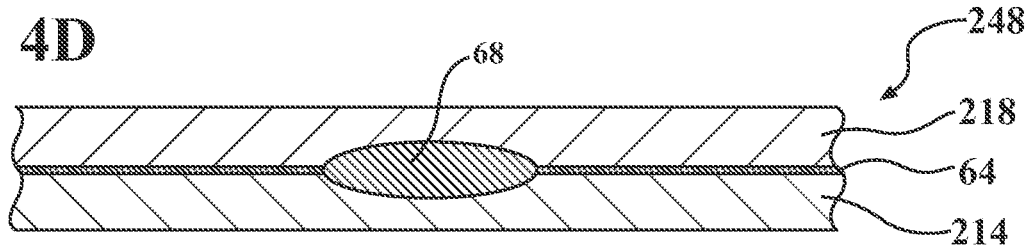
FIG. 4D is a schematic cross-sectional view of bonded assembly formed by joining the stack-up of FIGS. 4B-4C, in accordance with the principles of the present disclosure.

Referring now to FIG. 4D, a balanced weld nugget 68 is therefore formed at the faying surfaces 144, 66 of the second steel work-piece 218 and the coating 64, where the weld nugget 68 penetrates well into both of the first and second work-pieces 214, 218. For example, the weld nugget 68 may penetrate into each of the first and second work-pieces 214, 218 by 25-75% of the total of the weld nugget 60. Thus, FIG. 4D illustrates a bonded assembly 248 that includes the first member 214, the second member 218, and the coating 64 bonded together through the weld nugget 68.

The electrical resistivity of the coating 64 preferably has a value between the values of the resistivities of the first and second work-pieces 214, 218, but in some examples, the electrical resistivity of the coating 64 may be equal to or greater than that of the first work-piece 214. In some examples, the electrical resistivity of the coating 64 could be at least double the electrical resistivity of the second work-piece 218, and the electrical resistivity of the first work-piece 214 could be at least three times the electrical resistivity of the second work-piece 218.

Some examples of steel materials that could be used for the first work-piece 214 could be second-generation high-strength (GEN 2) steels (austenitic stainless steels), third-generation advanced high-strength (GEN 3) steels, transformation-induced plasticity (TRIP) steels, twinning-induced plasticity (TWIP) steels, boron steel alloys, and/or any other steel that has a relatively large electrical resistivity. Some examples of steel materials that could be used for the second work-piece 218 include interstitial free (IF) steels or other mild steels, high-strength low alloy steels (such as 340HSLA), dual-phase steels (such as DP590), and martensitic steels (such as MS1500). The coating 64 is preferably formed of a high electrical resistivity material. In some examples, the coating 64 could be formed of a boron steel alloy (such as PHS1300), a GEN 3 steel, a multi-phase steel (such as MP1180 or MP980), a dual-phase steel (such as DP980, DP780, or DP590), or a high-strength low alloy steel (such as 340HSLA). The coating 64 could alternatively be formed of nickel or an aluminum-silicon alloy, or an adhesive material containing steel, nickel, and/or an aluminum-silicon alloy.

Though the multiple work-piece stack-ups 20, 120, 220 illustrated herein include two or three work-pieces, additional work-pieces could be included in the stack-ups 20, 120, 220, such as including a fourth work-piece, without falling beyond the spirit and scope of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:
1. A method of joining a multiple member work-piece, comprising:
   providing a first steel work-piece having a first electrical resistivity;
   providing a second steel work-piece having a second electrical resistivity that is lower than the first electrical resistivity;
   disposing a third material in contact with the second steel work-piece, the third material having a third electrical resistivity that is greater than the second electrical resistivity; and
   resistance welding the first and second steel work-pieces and the third material together.

2. The method of claim 1, further comprising providing at least one of the third electrical resistivity and the first electrical resistivity as being at least double the second electrical resistivity.

3. The method of claim 1, further comprising providing the third electrical resistivity as being at least double the second electrical resistivity.

4. The method of claim 3, further comprising providing the first electrical resistivity as being at least three times the second electrical resistivity.

5. The method of claim 4, further comprising providing the third electrical resistivity as being less than three times the second electrical resistivity.

6. The method of claim 5, further comprising forming the first steel work-piece of a third-generation (GEN 3) steel, forming the second steel work-piece of an interstitial free (IF) steel, and providing the third material as a boron steel alloy.

7. The method of claim 1, further comprising providing the third material in the form of a rivet inserted through the second steel work-piece, the rivet having a head disposed on an outer side of the second steel work-piece, wherein the step of resistance welding includes pressing a first electrode against the head of the rivet and a second electrode against an outer side of the first steel work-piece and passing a current between the first and second electrodes through the first and second steel work-pieces and through the rivet.

8. The method of claim 7, further comprising providing the rivet as being in contact with the first steel work-piece.

9. The method of claim 1, further comprising providing the third material in the form of a third steel work-piece disposed between the first and second steel work-pieces.

10. The method of claim 9, further comprising disposing a rivet through the second steel work-piece and into the third steel work-piece, the rivet having a head disposed on an outer side of the second steel work-piece, wherein the step of resistance welding includes pressing a first electrode against the head of the rivet and a second electrode against an outer side of the first steel work-piece and passing a current between the first and second electrodes through the first, second, and third steel work-pieces and through the rivet, the rivet being formed of a material having a fourth electrical resistivity that is greater than the second electrical resistivity.

11. The method of claim 1, further comprising providing the third material in the form a coating disposed between the first and second steel work-pieces and in contact with both the first and second steel work-pieces.

12. The method of claim 11, wherein the third material is selected from the following group of materials: nickel, an aluminum-silicon alloy, and a boron steel alloy.

13. A bonded assembly comprising:
a first member formed of a first steel material having a first electrical resistivity;
a second member formed of a second steel material having a second electrical resistivity that is lower than the first electrical resistivity; and
a third material disposed in contact with the second member, the third material having a third electrical resistivity that is greater than the second electrical resistivity, the first and second members and the third material being bonded together.

14. The bonded assembly of claim 13, wherein at least one of the third electrical resistivity and the first electrical resistivity is at least double the second electrical resistivity.

15. The bonded assembly of claim 13, wherein the third electrical resistivity is at least double the second electrical resistivity.

16. The bonded assembly of claim 15, wherein the first electrical resistivity is at least three times the second electrical resistivity, and the third electrical resistivity is less than three times the second electrical resistivity.

17. The bonded assembly of claim 16, the first member being formed of a GEN3 steel, the second member being formed of an interstitial free (IF) steel, and the third material being a boron steel alloy.

18. The bonded assembly of claim 13, wherein the third material is in the form of a rivet having a shank inserted through the second member and in contact with the first member, the rivet having a head disposed on an outer side of the second member, the head of the rivet being bonded to the second member, and the shank of the rivet being bonded to both the first member and the second member.

19. The bonded assembly of claim 13, wherein in the third material is in the form of a third member sandwiched between the first and second members, the third member being formed of a third steel, the bonded assembly further comprising a rivet having a head disposed in contact with an outer side of the second member and a shank inserted through the second member and being in contact with the third member, the head of the rivet being bonded to the second member, and the shank of the rivet being bonded to both the second member and the third member.

20. The bonded assembly of claim 13, wherein the third material is in the form of a coating disposed between the first and second members, the coating being in contact with both the first and second members.

* * * * *